US012308576B2

(12) United States Patent
Meier

(10) Patent No.: US 12,308,576 B2
(45) Date of Patent: May 20, 2025

(54) SHIELDED PLUG CONNECTOR MODULE

(71) Applicant: HARTING Electric Stiftung & Co. KG, Espelkamp (DE)

(72) Inventor: Heiko Meier, Minden (DE)

(73) Assignee: HARTING Electric & Stiftung & Co. KG, Espelkamp (DE)

( * ) Notice: Subject to any disclaimer, the term of this patent is extended or adjusted under 35 U.S.C. 154(b) by 347 days.

(21) Appl. No.: 17/910,843

(22) PCT Filed: Mar. 10, 2021

(86) PCT No.: PCT/DE2021/100247
§ 371 (c)(1),
(2) Date: Sep. 12, 2022

(87) PCT Pub. No.: WO2021/185410
PCT Pub. Date: Sep. 23, 2021

(65) Prior Publication Data

US 2023/0114787 A1 Apr. 13, 2023

(30) Foreign Application Priority Data

Mar. 20, 2020 (DE) ..................... 10 2020 107 725.4

(51) Int. Cl.
*H01R 13/6582* (2011.01)
*H01R 13/504* (2006.01)
(Continued)

(52) U.S. Cl.
CPC ....... *H01R 13/6582* (2013.01); *H01R 13/504* (2013.01); *H01R 13/506* (2013.01);
(Continued)

(58) Field of Classification Search
CPC .............. H01R 13/6582; H01R 13/504; H01R 13/506; H01R 13/514; H01R 13/516; H01R 43/16
(Continued)

(56) References Cited

U.S. PATENT DOCUMENTS 3,576,520 A * 4/1971 Stauffer ............... H01R 13/518 257/725
5,595,507 A * 1/1997 Braun ...................... H01R 4/64 439/94
(Continued)

FOREIGN PATENT DOCUMENTS

DE 29601998 U1 4/1996
DE 10247274 A1 4/2004
(Continued)

OTHER PUBLICATIONS

Company Brochure „Industrial Ethernet Katalog 2014/2015 Let's connect., Weidmüller Interface GmbH & Co. KG Klingenbergstraße 16, 32758 Detmold, Germany; Modul mit Schirmblech (Kapitel J).
(Continued)

*Primary Examiner* — Gary F Paumen
(74) *Attorney, Agent, or Firm* — Smartpat PLC

(57) ABSTRACT

In order to improve the shielding of a plug connector module (1, 1') and of a plug connector modular system equipped therewith, in particular against high-frequency interference fields, the insulation body (10, 10') of said module is form-fittingly surrounded all around by a shielding element (15, 15'). This additionally allows the earth connection of a metal plug connector modular frame (2) to a shield transfer element (14, 14') of the plug connector module (1, 1') and thus also an earth connection to a mating connector. Thus the shield element (15, 15') itself is also earthed all around and at multiple points, and as a result can suppress the effect of in particular high-frequency electrical and/or magnetic interference fields particularly well.

13 Claims, 5 Drawing Sheets

(51) Int. Cl.

| | |
|---|---|
| ***H01R 13/506*** | (2006.01) |
| ***H01R 13/514*** | (2006.01) |
| ***H01R 13/516*** | (2006.01) |
| ***H01R 43/16*** | (2006.01) |

(52) U.S. Cl.
CPC ......... *H01R 13/514* (2013.01); *H01R 13/516* (2013.01); *H01R 43/16* (2013.01)

(58) Field of Classification Search
USPC .................................... 439/607.01, 532, 716
See application file for complete search history.

(56) References Cited

U.S. PATENT DOCUMENTS

| | | | | |
|---|---|---|---|---|
| 5,800,187 | A * | 9/1998 | Vermon | H01R 4/2445 439/716 |
| 5,989,062 | A * | 11/1999 | Daoud | H01R 13/518 439/716 |
| 6,004,162 | A * | 12/1999 | Harting | H01R 13/518 439/716 |
| 6,142,835 | A * | 11/2000 | Daoud | H04Q 1/09 439/94 |
| 7,316,591 | B2 * | 1/2008 | Ferderer | H01R 13/506 439/716 |
| 11,258,207 | B2 * | 2/2022 | Dück | H01R 13/6582 |
| 2003/0194914 | A1 | 10/2003 | Duck et al. | |
| 2004/0033720 | A1 * | 2/2004 | Bergner | H01R 9/2675 439/532 |
| 2004/0053534 | A1 | 3/2004 | Beneke et al. | |
| 2004/0142598 | A1 | 7/2004 | Lappohn | |
| 2006/0025010 | A1 * | 2/2006 | Spitaels | H04Q 1/13 439/532 |
| 2007/0155252 | A1 | 7/2007 | Ferderer | |
| 2011/0159733 | A1 * | 6/2011 | Wang | H01R 13/658 439/607.01 |
| 2011/0201228 | A1 | 8/2011 | Schumacher et al. | |
| 2011/0217880 | A1 | 9/2011 | Schmidt et al. | |
| 2012/0034817 | A1 | 2/2012 | Plate et al. | |
| 2013/0217268 | A1 | 8/2013 | Duan et al. | |
| 2014/0179172 | A1 | 6/2014 | Riepe et al. | |
| 2015/0199603 | A1 | 7/2015 | Troeger et al. | |
| 2015/0280351 | A1 | 10/2015 | Bertsch | |
| 2016/0056567 | A1 | 2/2016 | Dugo | |
| 2016/0093980 | A1 | 3/2016 | Beischer et al. | |
| 2016/0276778 | A1 | 9/2016 | Beischer et al. | |
| 2018/0241149 | A1 | 8/2018 | Herbrechtsmeier et al. | |
| 2018/0254578 | A1 | 9/2018 | Herbrechtsmeier et al. | |
| 2020/0251849 | A1 | 8/2020 | Tiemann et al. | |
| 2021/0021086 | A1 | 1/2021 | Dück et al. | |
| 2021/0175668 | A1 | 6/2021 | Milligan et al. | |

FOREIGN PATENT DOCUMENTS

| | | | |
|---|---|---|---|
| DE | 202006012687 | U1 | 12/2007 |
| DE | 102009016157 | A1 | 10/2010 |
| DE | 202011050643 | U1 | 8/2011 |
| DE | 202012103360 | U1 | 1/2013 |
| DE | 202013103611 | U1 | 9/2013 |
| DE | 102012107270 | A1 | 2/2014 |
| DE | 102012110907 | A1 | 5/2014 |
| DE | 102013106279 | A1 | 12/2014 |
| DE | 102013113975 | A1 | 6/2015 |
| DE | 102015104562 | A1 | 9/2016 |
| DE | 102015015189 | | 3/2017 |
| DE | 102015114703 | A1 | 3/2017 |
| DE | 202018101278 | U1 | 3/2018 |
| DE | 102017108432 | A1 | 10/2018 |
| DE | 102018108968 | A1 | 10/2019 |
| EP | 1026788 | A1 | 8/2000 |
| EP | 0860906 | B1 | 5/2004 |
| EP | 1801927 | A1 | 6/2007 |
| EP | 1353412 | B1 | 5/2009 |
| EP | 1398853 | B1 | 8/2012 |
| EP | 2510589 | A1 | 10/2012 |
| EP | 2510590 | A1 | 10/2012 |
| EP | 2917974 | A1 | 9/2015 |
| EP | 2979326 | A1 | 2/2016 |
| EP | 3067993 | B1 | 1/2019 |
| KR | 102067192 | B1 | 1/2020 |
| WO | 2010046293 | A1 | 4/2010 |
| WO | 2018206048 | A1 | 11/2018 |
| WO | 2019113524 | A1 | 6/2019 |

OTHER PUBLICATIONS

Company catalogue Harting.com—the gateway to your country website, Harting Technology group, Jul. 10, 2019.
Knoblauch, Günter, "Steckverbinder II Neue Technologien, Produkte und Manage-ment-Konzepte" 3. Edition, pp. 154 to 193.
Michael Gesthuysen on behalf of Phoenix Contact GmbH & Co. KG, Opposition to German patent 10 2020 107 725 (German original + machine translation).
Peter Specht on behalf of Weidmüller Interface GmbH & Co. KG, additional remarks relating to opposition to German Patent DE 10 2020 107 725 (German original + machine translation).
Peter Specht on behalf of Weidmüller Interface GmbH & Co. KG, opposition to German Patent DE 10 2020 107 725 (German original + machine translation).

* cited by examiner

SHIELDED PLUG CONNECTOR MODULE

TECHNICAL FIELD

The disclosure relates to a plug connector module and a plug connector modular system which has a metal or at least partly metal plug connector modular frame and at least one plug connector module.

BACKGROUND

In the prior art, plug connector modular systems with plug connector modules with use of a plug connector modular frame, also known as a holding frame, module frame, hinged frame or modular frame, are disclosed in numerous documents and publications in many different variants, have been shown at trade fairs, and are often used in an industrial environment in the form of heavy duty plug connectors. For example, they are described in documents DE 10 2013 106 279 A1, DE 10 2012 110 907 A1, DE 10 2012 107 270 A1, DE 20 2013 103 611 U1, EP 2 510 590 A1, EP 2 510 589 A1, DE 20 2011 050 643 U1, EP 0 860 906 A2, DE 29 601 998 U1, EP 1 353 412 A2, DE 10 2015 104 562 A1, EP 3 067 993 A1, EP 1 026 788 A1, EP 2 979 326 A1 and EP 2 917 974 A1.

Said document EP 0 860 906 B1 describes a plug connector modular frame in the form of a hinged frame for holding plug connector modules and for installation in plug connector housings or for screwing to wall surfaces. In that case, the plug connector modules are inserted into the plug connector modular frames. Holding means are provided on the plug connector modules and cooperate with windows provided on opposite side parts of the plug connector modular frame, wherein the windows consist of rectangular recesses which are formed as through openings, closed on all sides, in the side parts of the plug connector modular frame.

In the embodiment as a hinged frame, the plug connector modular frame consists of two frame halves hinged together, wherein the separation of the plug connector modular frame is provided transversely to the side parts of the frame. Hinges are arranged in the fastening ends of the plug connector modular frame, so that the side parts, as the plug connector modular frame is screwed onto a fastening surface, are oriented at right angles to the fastening surface, whereby the plug connector modules enter into a form fitting connection to the plug connector modular frame via the holding means. In practice, such plug connector modular frames are usually manufactured in a die casting process, in particular in a zinc die casting process.

Document DE 10 2015 114 703 A1 discloses a development of such a plug connector modular frame designed as a hinged frame. The plug connector modular frame disclosed therein comprises at least one fixing means, via which the frame halves are fixable relative to one another in two positions, that is to say an open position and a closed position, which significantly simplifies the handling.

Document DE 20 2013 103 611 U1 presents two frame halves which can be screwed to one another in an extremely stable manner, can be produced in a stamping and bending process, can be screwed together economically, and are suitable for receiving, inter alia, pneumatic modules. The plug connector modular frame thus assembled also has only very low creeping properties even under high mechanical long term loading. A disadvantage, however, is that the effort for adding or changing a plug connector module is extremely high.

It has been found, however, in practice that such plug connector modular frames require complex operation during the assembly process. For example, such plug connector modular frames also have to be unscrewed and/or unlatched from the plug connector housing, as soon as even only one single module requires replacement. In so doing, it may be that the other plug connector modules, the removal of which was not desired at all, may fall out from the plug connector modular frame and then have to be reinserted before the frame halves are screwed together and/or latched together. Lastly, already before the frame halves are joined together, all plug connector modules must be located simultaneously in their intended position in order to be ultimately fixed in the plug connector modular frame when the frame halves are joined together, which complicates the assembly process.

Document EP 1 801 927 B1 discloses a one part plug connector modular frame which consists of plastics material. The plug connector modular frame is formed as a peripheral collar and has, on its plug in side, a plurality of wall segments separated by slots. Each two opposite wall segments form an insertion region for a plug connector module, wherein the wall segments have window like openings, which serve to receive protrusions integrally molded on the narrow sides of the plug connector modules. Furthermore, a guide groove is provided in each of the wall segments. The guide groove is formed above the openings by means of an outwardly offset window bar, which has an insertion chamfer on the inner side. The plug connector modules additionally have detent arms, which are integrally molded on the narrow sides, acting in the direction of the cable connections, and latch below the lateral collar wall, so that two independent detent means fix the plug connector modules in the plug connector module frame. This plastics frame has the disadvantage that it does not allow PE protective grounding, since it does not comprise any electrically conductive material.

Document DE 10 2013 113 975 B4 discloses a plug connector modular frame, in particular formed from die cast zinc, for a heavy plug connector for receiving identical and/or different plug connector modules. The plug connector modular frame consists of a basic frame, which is rectangular in cross section and has two opposite side parts. A cheek part, consisting of a flexible material, in particular spring elastic sheet metal is attached to the side parts. As a plug connector module is introduced into the plug connector modular frame perpendicularly to the frame plane, these cheek parts are firstly bent outwardly away from the side part. In particular, the cheek parts can have tabs with detent windows, which are suitable for latching the plug connector modules at their detent lugs individually in the plug connector modular frame. The plug connector modules can thus be inserted individually and with only little effort from the cable connection direction and in the plug in direction into the plug connector modular frame and can be removed again in the opposite direction. The plugged in plug connector module is held firmly and in a stable manner in the frame plane by the basic frame of the plug connector modular frame. In their insertion direction, perpendicular to the frame plane, they can each latch with their detent lugs between mutually opposed cheek parts. This design has in principle the advantage that the plug connector modules can be individually plugged in and removed, without compromising the fastening of the plug connector modules. The design also allows the plug connector modular frame to consist of metal and to have a PE contact or to be equipped with such a contact, and thus allows the protective grounding of a metal plug connector housing into which the plug connector modular frame is screwed, and to a certain extent also an electrically and/or magnetically shielding function of the plug connector modules.

In principle, in the prior art there is a disadvantage that, even when using metal plug connector modular frames, the electrical shielding of individual plug connector modules is not always sufficient.

In particular, electrical signals which are transferred via plug connector modules may be disrupted by electrical and/or magnetic fields which are created outside the plug connector module in question but within the plug connector modular frame. Such interference may be for example by the one electrical power supply with alternating current. Furthermore, electrical and/or magnetic fields created outside the plug connector modular frame may also cause interference for said electrical signals within the plug connector module.

For signal transmission that is free from interfering radiation, document EP 1 398 853 B1 proposes that a plug connector module in a holding body consisting of insulating material has an electrically conductive shell housing with a plug insert. The plug connector module is held by means of detent means in a module carrier device, which is in turn integrated in a plug connector housing. An electrically conductive contacting with the shielding of a signal conducting cable is provided within the shell housing, so that a plurality of plug connector modules, with ground potentials independent of one another as well as plug connector modules which transfer a power supply, pneumatics or the like can also be arranged in the module carrier device without influencing one another.

In this design it has proven to be disadvantageous for many applications that there is no shield transfer and therefore no direct potential balancing of the shield between the plug connector module and a plug connector module of a mating plug plugged therewith. This has proven to be disadvantageous in particular for high frequency signals.

In order to overcome this problem, document DE 10 2018 108 968 A1 discloses that both plug connector modules plugged to one another each have a shield transfer element. A cable, for example with a shield braid, attached on the cable connection side to each plug connector module is connected to this shield transfer element. The shield transfer elements each cover a large area of a side face of the plug connector module and are electrically contactable with one another on the plug in side. Both shield transfer elements consist of a metal material, which in particular has good electrically conductive properties. As a result of these shield transfer elements, the wave resistance, also referred to as the wave impedance, can be significantly reduced.

During operation of this design, however, it has proven to be disadvantageous that the cross section of the ground connection of the connected cable is often too small. Furthermore, there is thus still no direct potential equalization ensured between a metal plug connector modular frame and the shield transfer elements. The shields known from the prior art are interrupted at least on the narrow sides of the substantially cuboidal plug connector modules. Plug connector modules already available on the market cannot be retrofitted appropriately with the known shield devices.

The German Patent and Trade Mark Office searched the following prior art in the priority application to the present application: DE 10 2015 015 189 B3, DE 20 2006 012 687 U1, DE 20 2018 101 278 U1 and WO 2019/113 524 A1.

SUMMARY

Plug connector modules are required as part of a plug connector modular system in order to be able to adapt a plug connector, in particular a heavy duty industrial plug connector, flexibly to certain requirements in respect of the signal and energy transfer, for example between two electrical devices. A very wide range of, for example optical and/or electrical analogue and/or digital signals and/or electrical energy can thus be transferred via one plugged connection in a flexibly combinable manner depending on requirements.

The corresponding plug connector modules are for this purpose usually inserted into matching plug connector modular frames, which are sometimes also referred to as holding frames, hinged frames, module frames or modular frames. The plug connector modular frames are thus used to receive a plurality of identical and/or also different plug connector modules and to fasten these securely to a surface and/or a device wall and/or in a plug connector housing, or the like.

The plug connector modules generally each have a substantially cuboidal insulation body. These insulation bodies can be formed in two parts, for example, and can consist of a contact carrier and a holding plate. They can thus receive plug contacts in their contact chambers and can fix said plug contacts therein.

The plug contacts of different plug connector modules can be of many different kinds. The function of a plug connector formed as a result is thus very versatile. For example, pneumatic modules, optical modules and modules for transferring electrical energy and/or electrical analogue and/or digital signals can be received in the particular insulation body or housing and can thus be used in the plug connector modular system. Plug connector modules are also increasingly being used to perform measuring and data related tasks and are therefore particularly sensitive to interference, in particular to electrical and/or magnetic interference fields and crosstalk.

In order to hold a plurality of these modules in the plug connector housing, plug connector modular frames are generally used. These can be formed of two frame halves, which are fixable relative to one another and which are hinged together. The plug connector modules are provided with approximately rectangular detent lugs, protruding on the narrow sides, as retaining and polarization means in order to fix the plug connector modules and correctly orient them in the plug connector modular frame.

Recesses formed as openings closed on all sides, specifically so called “detent windows”, are provided in the side parts of the frame halves and are penetrated by the detent lugs when the plug connector modules are inserted form fittingly into the plug connector modular frames. In order to insert the plug connector modules, the plug connector modular frame is unfolded, i.e., opened, wherein the frame halves are folded open about the hinges only to such an extent that the plug connector modules can be inserted. The frame halves are then folded together, i.e., the plug connector modular frame is closed, wherein the holding means pass into the recesses and a secure, form fitting retention of the plug connector modules in the plug connector modular frame is provided.

The plug connector modular frames can be of various designs. For example, plug connector modular frames each having a rigid basic frame can be used. This basic frame can be produced in particular in a die casting method, for example in a zinc die casting method, and can be provided on its longitudinal side with a plurality of flexible cheek parts, for example with stamped and bent parts formed from spring elastic sheet metal. In this case, the cheek parts can comprise detent means, such as detent windows or detent hooks, or the like, with which the plug connector modules latch, for example with their detent lugs. For example, two cheek parts can be provided for each plug connector module, that is to say one on each longitudinal side of the basic frame, or one or more cheek parts which have a plurality of tabs can also be used. For example, one detent element can be arranged on each cheek part and/or each tab. Such plug connector modular frames have the advantage that the plug connector modules can be individually introduced into and removed from the plug connector modular frames with only little effort, and for example also in automated fashion.

An object of the disclosure lies in improving the shielding of a plug connector module and of a plug connector modular system equipped therewith, in order to thus ensure a particularly high quality of the electrical signals transferred by the plug connector module and in particular to minimize the negative influence of high-frequency electrical and/or magnetic interference fields on the quality of these signals.

The object is achieved by the subject matter of the independent claims.

A plug connector module has a substantially cuboidal insulation body formed from an electrically insulating material.

Furthermore, it has a plug-in side and, opposite and parallel thereto, a cable connection side. The cable connection side and the plug-in side are connected to one another via continuous contact chambers. The contact chambers serve to receive electrically conductive plug contacts.

Furthermore, the insulation body has two broad sides running perpendicularly to the cable connection side and plug-in side of the insulation body and arranged opposite and parallel to one another, and, at right angles thereto, two narrow sides arranged opposite and parallel to one another. A detent lug for fixing the plug connector module in a plug connector modular frame is integrally molded on each of these two narrow sides. These two mutually opposed detent lugs differ from one another in their shape and/or size in order to thus ensure, as polarization means, a correct orientation of the plug connector module in the plug connector modular frame.

The plug connector module is form-fittingly surrounded on its broad and narrow sides by a peripheral shield element, wherein the shield element covers more than 50% of the area of each of the broad and narrow sides. This means that the shield element covers more than 50% of the two broad sides and that the shield element covers more than 50% of the two narrow sides. Furthermore, the shield element is open both on the cable connection side and on the plug side of the module. The shield element thus has openings on the cable connection side and on the plug-in side of the insulation body.

A plug connector modular system has an at least partly metal plug connector modular frame and such a plug connector module, wherein the shield element, in order to produce an additional electrically conductive connection to the plug connector modular frame, has at least one outwardly directed contact tab on at least one of its narrow-side walls and is electrically connected to the plug connector modular frame via this outwardly directed contact tab.

Advantageous embodiments of the invention are described in the dependent claims and the following description.

The invention has the advantage that the signals transferred by the plug connector module are not subject to interference by electrical and/or magnetic fields created outside the plug connector module, or that such interference is at least largely suppressed.

In a preferred embodiment, the plug connector module has at least one electrical plug contact with a cable connection portion and a plug portion. The plug contact is inserted into at least one contact chamber of the insulation body. Its cable connection portion is accessible from the cable connection side of the insulation body, in order to advantageously allow the attachment of an electrical conductor of a cable, and its plug portion protrudes into the plug region of the insulation body in order to advantageously allow a plugged connection to a mating plug.

In an advantageous embodiment, the shield element is embodied substantially as a cuboidal frame, which, in a manner corresponding to the cube shape of the plug connector module, has two mutually opposed narrow-side walls and, at right angles thereto, two mutually opposed broad-side walls. This is particularly advantageous because the shield element can thus be slid onto the plug connector module in particular from the plug-in side direction and preferably with an accurate fit. Both plug connector modules intended for this purpose and also a multiplicity of plug connector modules existing already on the market can advantageously be provided in this way with such a shield element.

The shield element preferably has, at its cable-connection-side opening on the narrow-side walls, cutouts which surround the detent lugs at least in part on three sides. The detent lugs of the plug connector modules then protrude through the cutouts at least in part. This is particularly advantageous because the detent lugs, in spite of the shield element, can perform their function, which lies in latching the plug connector modular frame and ensuring the correct polarization, i.e., orientation, of the plug connector module in the plug connector modular frame.

In a further preferred embodiment, the shield element can consist of a sheet metal part. In particular, it can be embodied as a stamped and bent part and can be bent at right angles at four parallel bending edges. Furthermore, the shield element can have, at two fastening edges thus adjacent to one another, fastening means for fastening them to one another, so that the shield element is particularly advantageously shaped into a closed, i.e., peripheral form, in particular said cuboidal frame.

These fastening means can preferably consist of a dovetail connection, which can be produced particularly simply and in addition is stable.

In particular, the shield element can be a stamped and bent part, which advantageously can be produced economically and easily and can be used for shielding.

It is also particularly advantageous if the plug connector module, additionally to the preferably one-piece shield element, also has at least one shield transfer element, in a further embodiment a plurality of, for example two, shield transfer elements. This at least one shield transfer element can be arranged on one of the two broad sides of the plug connector module. For this purpose, in an advantageous embodiment, the plug connector module can have a corresponding recess on each of its corresponding broad sides, into which recesses the shield transfer element can preferably be inserted form-fittingly. This has the advantage that the cuboidal field element can be slid without difficulty onto the plug connector module provide with the at least one plug transfer element, without being hindered by the latter during this process.

The at least one shield transfer element can be formed from sheet metal. In particular, it can be a stamped and bent part. The shield transfer element can be substantially flat. This means that in particular a contact region of the shield transfer element, in order to contact a contact transfer element of a mating plug, can be bent slightly out of a main plane of the shield transfer element, for example in the form of a slight rounding for electrical contacting over a large area with a contact face of a shield transfer element of the mating plug.

The substantially flat shield transfer element, for ground connection to the cable, can also have, on the cable connection side, a shield attachment region, which is placed around the shield of the cable, for example in the form of a pinch contact/crimp contact, and can be pressed together by means of a tool, for example pliers.

In a preferred embodiment, the shield element, to establish the electrical contact with the shield transfer element, can have at least one, preferably a plurality of inwardly bent contact tabs. This is advantageous because a common ground contact in particular in the sense of a common grounding thus can be produced at as many contact regions as possible, in order to produce a shielding that is particularly effective also for high-frequency interfering signals. These inwardly directed contact tabs can advantageously be arranged in a broad-side wall, because they can then on the one hand directly contact the shield transfer element arranged beneath. In addition, this may be advantageous because sufficient space thus remains in the narrow-side walls to arrange there, for example, outwardly directly contact tabs for contacting a metal plug connector modular frame and/or inwardly directed detent tabs for latching the shield element to the plug connector module. The latter are particularly advantageously latched to the narrow side of the plug connector module because these narrow sides are preferably free from the shield transfer element, and therefore the latching cannot be hindered thereby.

The shield element is thus grounded at multiple points and can thus suppress particularly well the influence of, in particular, high-frequency electrical and/or magnetic fields on the electrical signals transferred by the plug connector module.

BRIEF DESCRIPTION OF THE DRAWINGS

An exemplary embodiment of the invention is shown in the drawings and will be explained in greater detail hereinafter.

DETAILED DESCRIPTION

The figures contain partly simplified, schematic illustrations. Sometimes, identical reference signs have been used for like, but possibly non-identical elements. Different views of like elements may be scaled differently.

Figure 1A:
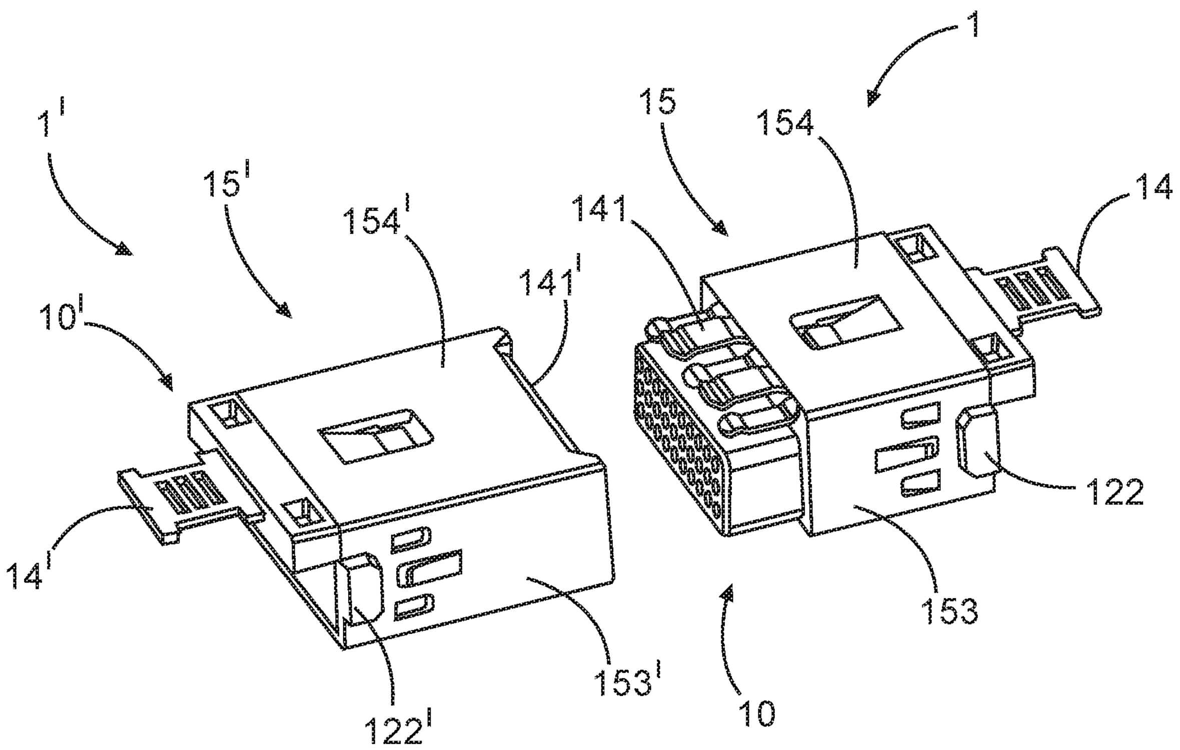
FIGS. 1*a* and 1*b* show two plug connector modules in the unplugged and plugged state.
Figure 1B:
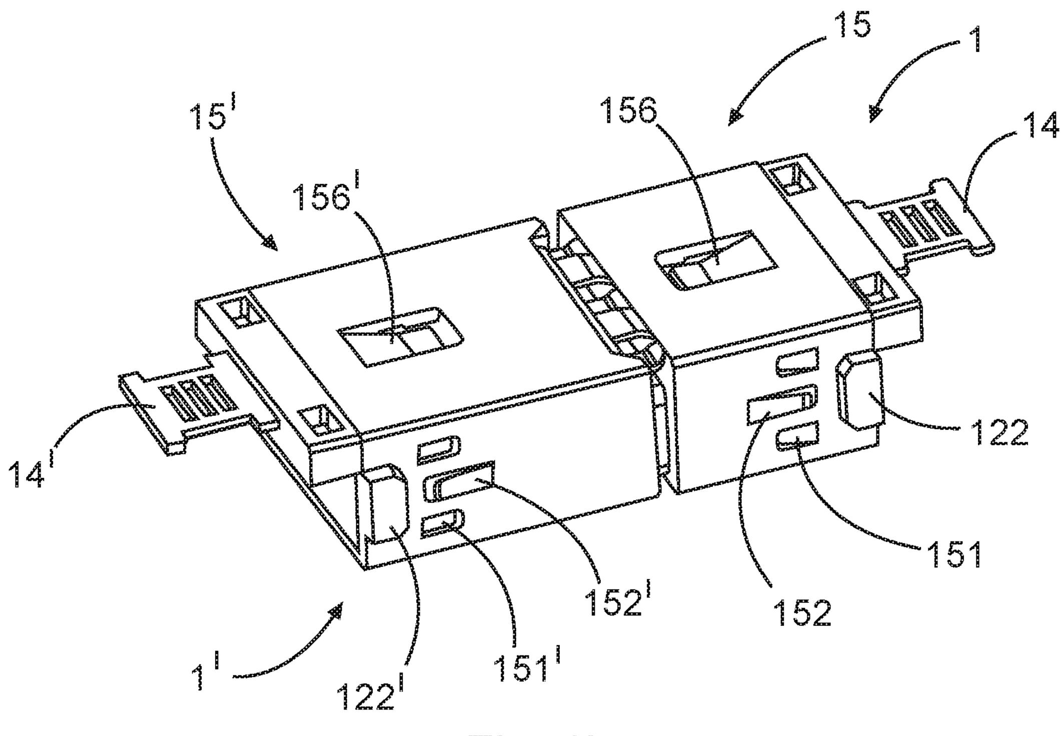

FIGS. 1*a* and 1*b* show a plug connector module 1 and a mating plug module 1' that can be plugged therewith and in principle is thus constructed in a comparable way, both in an unplugged state and in a state plugged together. For verbal simplification, the plug connector module 1 and the mating plug module 1' will also be referred to jointly hereinafter as plug connector modules 1, 1'.

Each of these plug connector modules 1, 1' has a substantially cuboidal insulation body 10, 10'.

The plug connector modules 1, 1' furthermore each have a frame-like shield element 15, 15', which surrounds the insulation body 10, 10' form-fittingly. The shield element 15, 15' is to this end likewise substantially cuboidal and has two narrow-side walls 153' and, at right angles thereto, two broad-side walls 154'.

Figure 5:
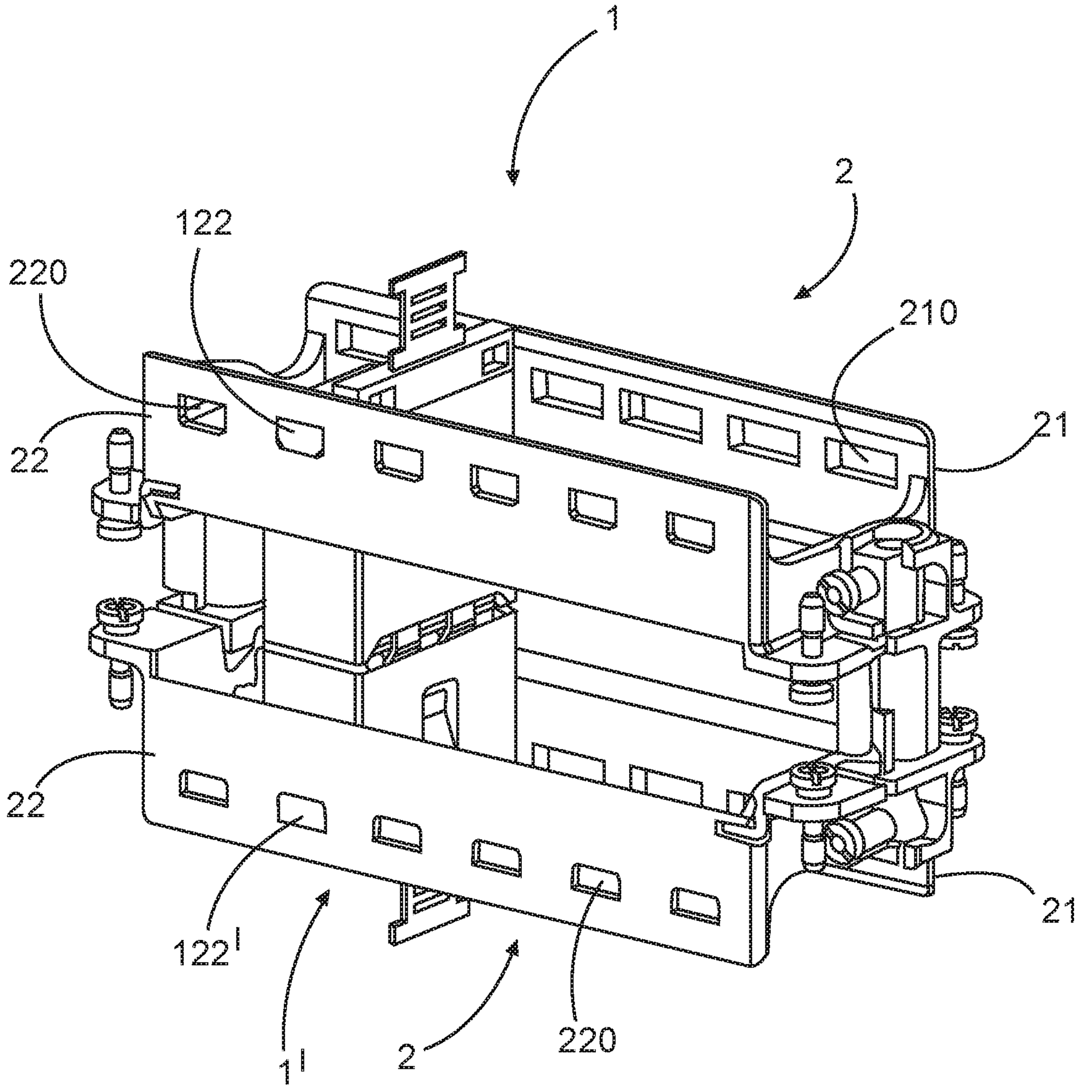
FIG. 5 shows two plug connector modular systems plugged to one another, each with a plug connector modular frame and a plug connector module.

Each shield element 15, 15' furthermore has, on its narrow-side walls 153, inwardly directed detent tabs 151, 151', denoted in FIG. 1*b*, in order to be fastened to the insulation body 10, 10' and outwardly directed contact tabs 152, 152' for electrically contacting a plug connector modular frame 2, into which the plug connector modules are insertable and in which they are fixable by means of their detent lugs 122, 122', wherein this is only shown explicitly for the first time, however, in FIG. 5.

In addition, each shield element, 15, 15', on its two mutually opposite broad-side walls 154, 154', has an inwardly directed contact tab 156, 156' for electrically contacting its substantially flat shield transfer element 14, 14'.

In the plugged state shown in FIG. 1*b*, the shield transfer elements 14, 14' contact one another by means of their contact portions 141, 141', which are denoted in FIG. 1*a*, and thus also ensure a mutual ground connection of their shield elements 15, 15'.

Figure 2A:
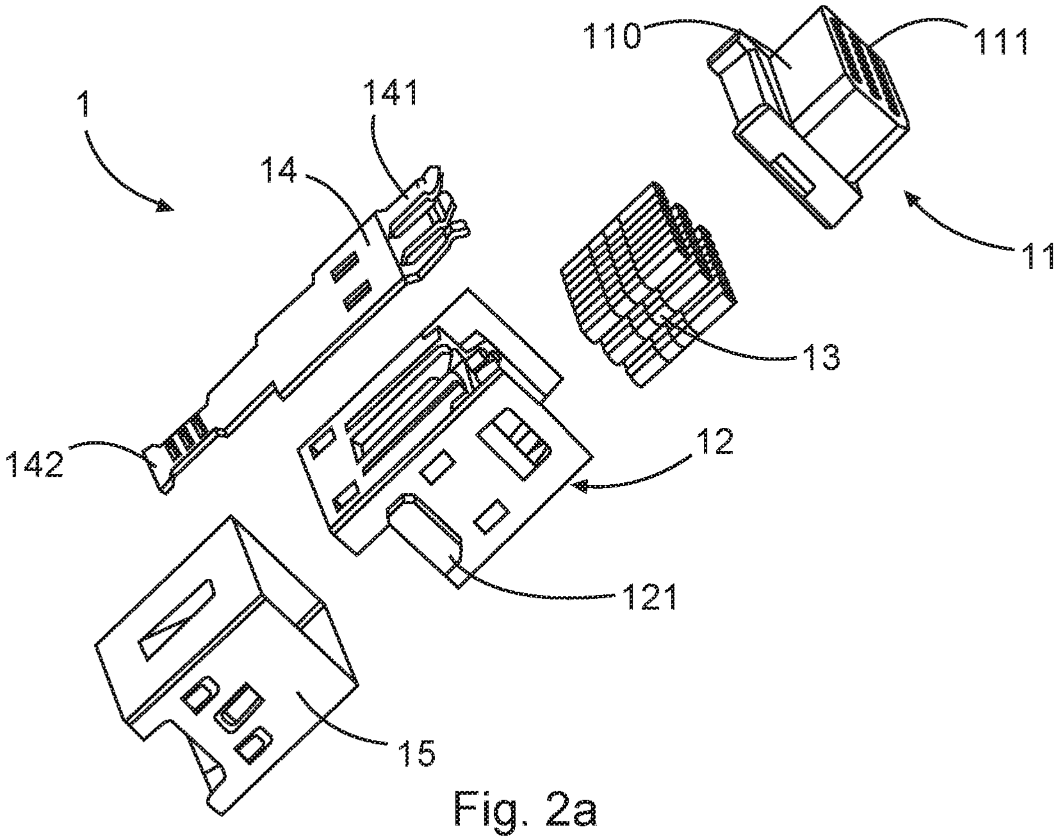
FIGS. 2*a* and 2*b* show the plug connector modules each in an exploded illustration.
Figure 2B:
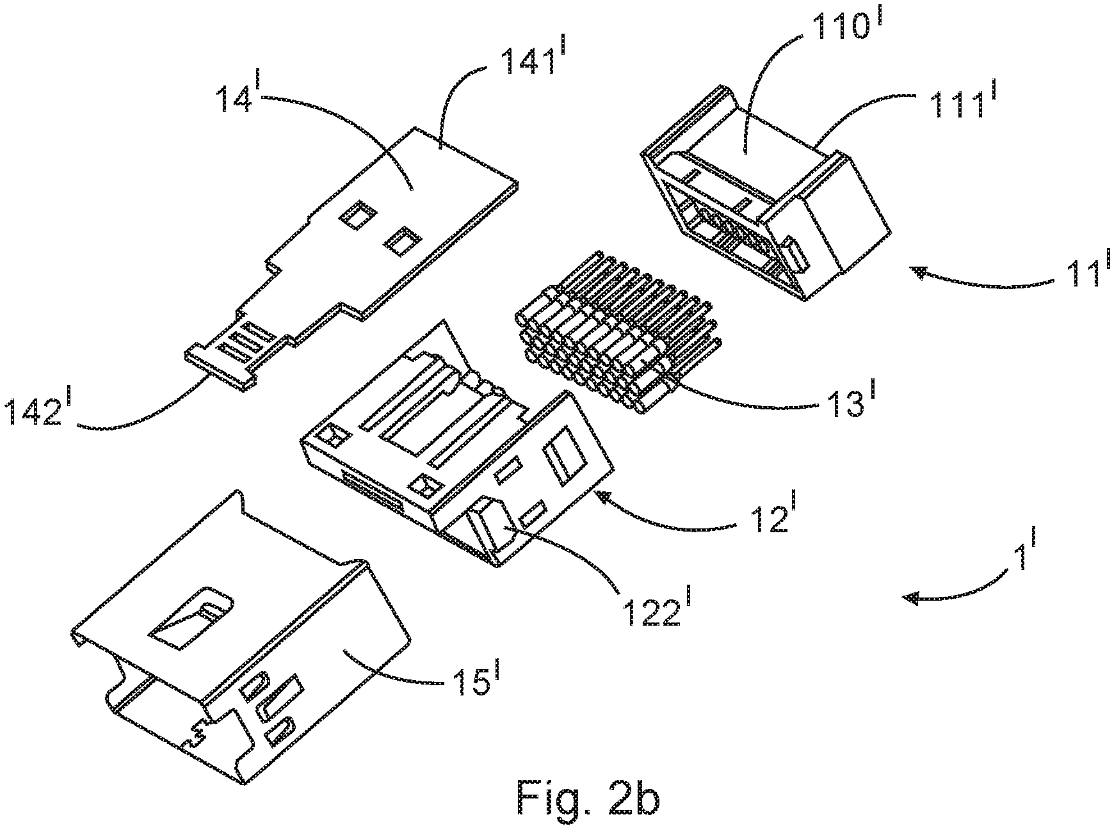

FIGS. 2*a* and 2*b* show the plug connector modules 1, 1' each in an exploded illustration. The plug connector modules 1, 1' each have a contact carrier 11, 11', a plurality of plug contacts 13, 13' and a holding plate 12, 12'. It is easily conceivable that each contact carrier 11, 11' and the associated holding plate 12, 12' are brought together and latched to one another in order to form the corresponding insulation body 10, 10', not presented in greater detail hereinafter, and thus fix the plug contact 13, 13' in continuous contact chambers 100, 100'.

In the present example, the plug contacts 13, 13' of the plug connector module 1 are embodied as socket contacts 13 and those of the mating plug module 1' as pin contacts 13'.

Furthermore, narrow-side detent lugs 121, 122' are integrally molded on the holding plates 12.

In addition, in the exploded illustrations, a substantially flat shield transfer element 14, 14' and a frame-like cuboidal shield element 15, 15' are each shown as a separate individual part. Both the shield transfer element 14, 14' and the shield element 15, 15' are produced by means of a stamping and bending technique. However, whereas the shield transfer 14, 14' is substantially flat, the shield element 15, 15' is bent at right angles at four edges and is shaped by means of a dovetail connection as fastening means at two fastening edges thus arranged adjacently to one another in order to form a closed frame. Of course, other fastening means for this purpose are known to a person skilled in the art.

The contact portion 141 of the shield transfer element 14 of the plug connector module 1 is stamped so as to be slightly fork-shaped and is bent slightly for improved contact with the planar contact portion 141' of the shield transfer element 14' of the mating plug 1'. Therefore, the contact tabs of the contact portion 141, which are not denoted in greater detail for reasons of clarity, have slightly rounded contacts. Nevertheless, both shield transfer elements 14, 14' are to be considered to be substantially flat.

On the cable connection side, the shield transfer elements 14, 14' each have a cable connection region 142, 142'. This can be placed around the shield braid of a connected cable, for example using pliers or another suitable tool, and can be mechanically fastened thereto and electrically connected therewith by means of a crimp connection.

Figure 3A:
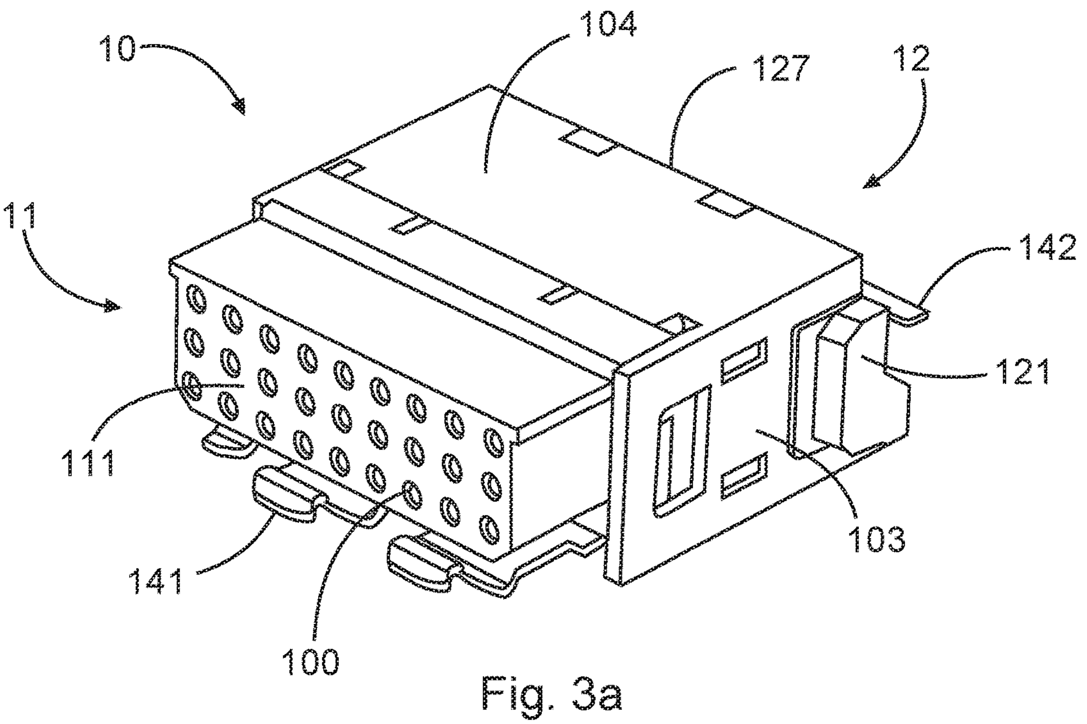
FIGS. 3*a* and 3*b* show two insulation bodies of the plug connector modules.
Figure 3B:
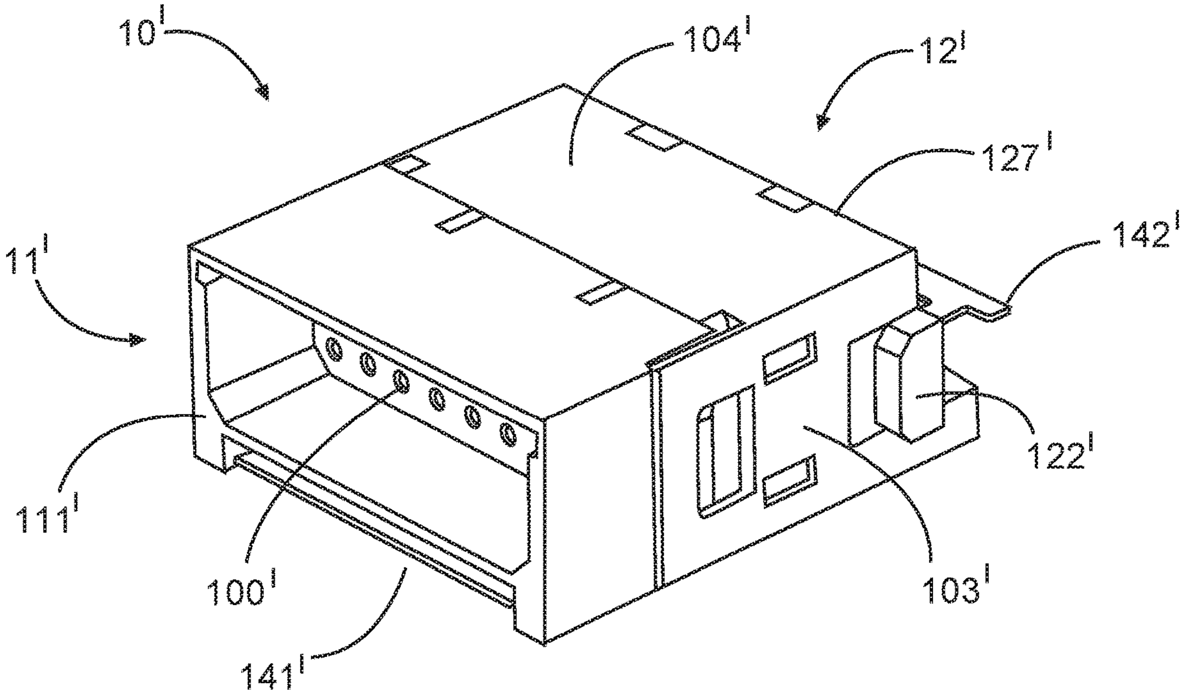

In FIGS. 3*a* and 3*b* the two insulation bodies 10, 10' assembled from the corresponding contact carrier 11, 11' and the associated holding plate 12, 12' can be seen. The insulation bodies 10, 10' are substantially cuboidal and consist of an electrically insulating material. On the side of the insulation bodies 10, 10' shown to be the lower side in this drawing, the respective contact portions 141, 141' of the shield transfer elements 14, 14' can be seen. On the cable connection side, the cable connection regions 142, 142' of the shield transfer elements 14, 14' can each be seen to some extent.

The insulation bodies 10, 10' have, on their respective holding plates 12, 12', a cable connection side 127, 127'. Opposite and parallel thereto, the insulation body 10, 10' has, on its contact carrier 10, 10', said plug-in region 110, 110' with a plug-in side 111, 111'. The plug-in side 111, 111' and the cable connection side 127, 127' are connected to one another via the contact chambers 100, 100', which are continuous through the insulation body 10, 10'. The contact chambers 100, 100' serve to receive the plug contacts 13.

Furthermore, the insulation bodies 10, 10' each have two broad sides 104, 104' running perpendicularly to the contact side 111, 111' and cable connection side 127, 127' and arranged oppositely and parallel to one another, and, at right angles thereto, two narrow sides 103, 103' arranged oppositely and parallel to one another. A detent lug 121, 122, 121' 122' is integrally molded on each of the two narrow sides 103, 103', wherein in this illustration only one detent lug 121, 122' can be seen, because the other detent lug 121', 122 is hidden by the insulation body 10, 10'.

Figure 4A:
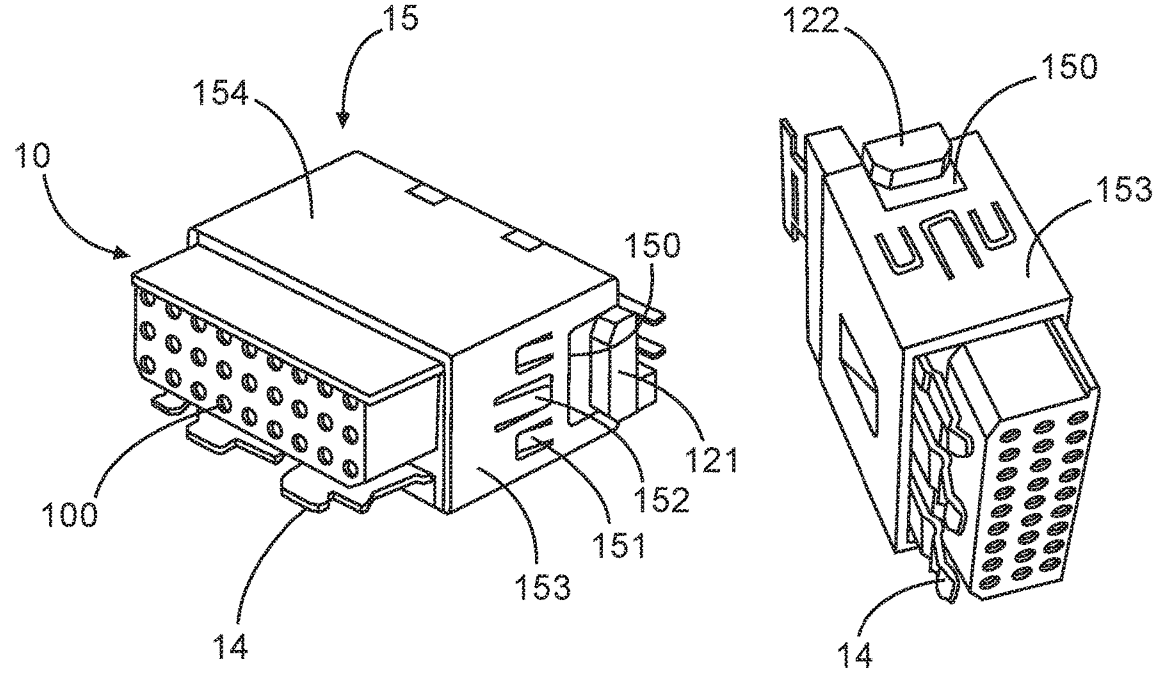
FIGS. 4*a* and 4*b* show the plug connector modules each with a shield element.
Figure 4B:
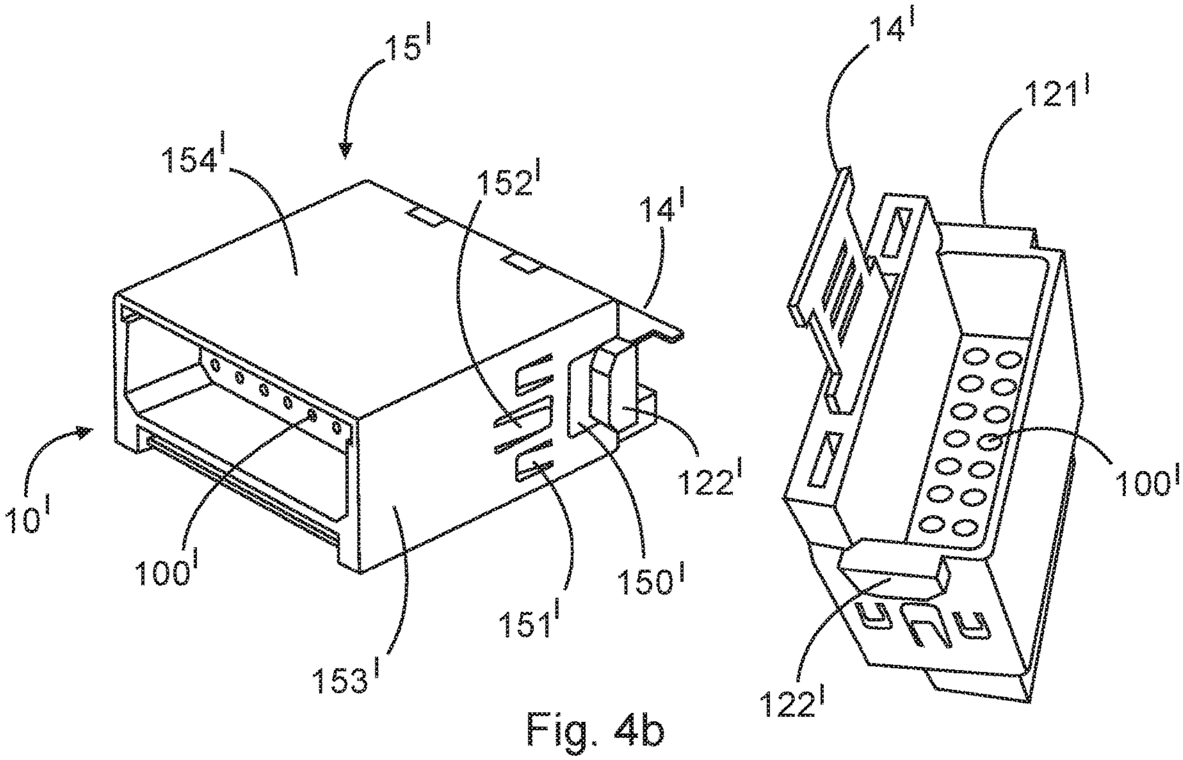

In FIGS. 4*a* and 4*b*, the plug connector modules 1, 1' are each shown in two views. The associated insulation bodies 10, 10' are surrounded form-fittingly on their broad 104 and narrow sides 103' by the shield element 15, 15' running around over 360°, wherein the shield element 15, 15' in each case covers the majority of the area—and therefore more than 50% of the area—of the broad 104, 104' and the narrow sides 103, 103'. To this end, each shield element 15, 15' is slid on the plug-in side onto the corresponding insulation body 10, 10'. Furthermore, the shield element 15, 15' is open both on the cable connection side 127, 127' and on the plug-in side 111, 111' of the insulation body 10, 10'.

The shield element 15, 15' is to this end likewise substantially cuboidal and has two narrow-side walls 153' and, at right angles thereto, two broad-side walls 154'.

On the narrow-side walls 153, 153', the shield element 15, 15' has inwardly directed detent tabs 151, 151' for fixing said shield element to the insulation body 10, 10'.

In addition, the shield element 15, 15' on its narrow-side walls 103, at its opening on the cable connection side, has cutouts 150, 150', which surround the detent lugs 121, 121', 122, 122' at least in part on three sides. The detent lugs 121, 121', 122, 122' of the plug connector modules 1, 1' thus protrude through the cutouts 150, 150'. This is particularly advantageous because the detent lugs 121, 121', 122, 122' can in this way perform their function in spite of the corresponding shield element 15, 15'.

This function can be seen particularly clearly in FIG. 5. It consists of the detent lugs 121, 122, 121', 122' of the plug connector modules 1, 1' latching in detent windows 20, 20' of a plug connector modular frame 2. Due to their different size, they ensure the correct polarization, i.e., orientation, of the particular plug connector module 1, 1' in the plug connector modular frame 2. The plug connector modular frame 2 in this case is a hinged frame, which has been produced in a zinc die-casting process. However, it is clear to a person skilled in the art that any other plug connector modular frame is also suitable similarly for this application, provided it consists at least in part of metal in order to ensure the electrical conductivity required for connection to ground.

In this illustration, two identical plug connector modular frames 2 are shown, one of which houses the plug connector module 1 and the other the mating plug connector module 1'. Each plug connector modular frame 2 has two side walls 21, 22, which are arranged opposite one another and which differ by the size of the detent windows 210, 220 arranged therein. It can be easily seen that an incorrect orientation of the plug connector modules 1, 1' is prevented on account of the differently sized detent windows 210, 220.

The plug connector modules 1, 1' are not in mutual plugged contact, but, as can also be clearly seen in FIG. 1*b*, are also electrically connected to one another over a large area in order to improve the shielding and/or grounding with their shield transfer elements 14, 14'. The two shield transfer elements 14, 14' to this end contact one another via their contact portions 141, 141'.

In addition, the shield elements 15, 15' contact the corresponding metal plug connector modular frame 2 by means of their outwardly directed contact tabs 152, 152' and contact the corresponding shield transfer element 14, 14' by means of the inwardly bent contact tabs 156, 156' and thus ensure a grounding at multiple points and thus ensure a particularly efficient shielding with respect to high-frequency interference fields.

Although the figures show different aspects or features of the invention in combination, it is evident to a person skilled in the art—unless stated otherwise—that the shown and discussed combinations are not the only possible ones. In particular, units or feature combinations corresponding to one another from different exemplary embodiments can be swapped for one another.

LIST OF REFERENCE SIGNS

1, 1' plug connector modules (plug connector module, mating plug module)
10, 10' insulation bodies
100, 100' contact chambers
103, 103' narrow side
104, 104' broad side
11, 11' contact carrier
110, 110' plug-in region
111, 111' plug-in side
12, 12' holding plate
121, 121, 122, 122' detent lugs
127, 127' cable connection side
13, 13' plug contact (socket contacts, pin contacts)
14, 14' shield transfer element
141, 141' contact portion of the shield transfer element
142, 142' cable connection region of the shield transfer element
15, 15' shield element
150, 150' cutouts
151, 151' detent tabs of the shield element
152, 152' outwardly directed contact tabs
153, 153' narrow-side wall
154, 154' broad-side wall
156, 156' inwardly directed contact tabs
2 plug connector modular frame 21, 22 side walls of the plug connector modular frame
210, 220 detent windows of the plug connector modular frame

The invention claimed is:

1. A plug connector module (1, 1'), comprising:
a substantially cuboidal insulation body (10, 10') formed from an electrically insulating material,
wherein the insulation body (10, 10') has
a plug in region (110, 110') with a plug in side (111, 111') and, opposite and parallel thereto,
a cable connection side (127, 127'),
wherein the cable connection side (127, 127') and the plug in side (111, 111') are connected to one another via continuous contact chambers (100, 100') for receiving electrically conductive plug contacts (13, 13'),
wherein the insulation body (10, 10') furthermore has
two narrow sides (103, 103') running perpendicularly to its cable connection side (102, 102') and plug in side (111, 111') and arranged opposite and parallel to one another, and, at right angles thereto,
two broad sides (104, 104') arranged opposite and parallel to one another,
wherein a detent lug (121, 121', 122 122') for fixing the plug connector module (1, 1') in a plug connector modular frame (2) is integrally molded on each narrow side,
wherein these two mutually opposed detent lugs (121, 121', 122, 122') differ in their shape and/or size in order to thus ensure, as polarization means, a correct orientation of the plug connector module (1, 1') in the plug connector modular frame (2),
wherein the plug connector module (1, 1') is form fittingly surrounded on its broad (104, 104') and narrow sides (103, 103') by a peripheral shield element (15, 15'),
wherein the shield element (15, 15') covers more than 50% of an area of each of the broad sides (104, 104') and narrow sides (103, 103') and has an opening both on the cable connection side (127, 127') and on the plug in side (111, 111') of the insulation body (10, 10'),
wherein the plug connector modular frame (2) is at least partly metal, and
wherein the shield element (15, 15'), to establish an additional electrically conductive connection to the plug connector modular frame (2), has at least one outwardly directed contact tab (152, 152') on at least one of its narrow side walls (153, 153').

2. The plug connector module (1, 1') as claimed in claim 1,
wherein the plug connector module (1, 1') has
at least one electrical plug contact (13, 13') with a cable connection portion and
a plug portion, said plug contact being inserted into one of the contact chambers, (100, 100') of the insulation body (10, 10')
wherein the cable connection portion is accessible from the cable connection side (127, 127') of the insulation body (10, 10'), and
wherein the plug portion protrudes into the plug in region (110, 110') of the insulation body (10, 10').

3. The plug connector module (1, 1') as claimed in claim 1,
wherein the shield element (15, 15') is embodied substantially as a cuboidal frame, which, in a manner corresponding to the cube shape of the plug connector module (1, 1'), has two mutually opposed narrow side walls (153, 153') and, at right angles thereto, two mutually opposed broad side walls (154, 154').

4. The plug connector module (1, 1') as claimed in claim 1,
wherein the shield element (15, 15') has, at its cable connection side opening on its narrow side walls (153, 153'), cutouts (150, 150') which surround the detent lugs (121, 121') 122, 122') at least in part on three sides, and
wherein the detent lugs (121, 121', 122, 122') of the plug connector modules (1, 1') protrude through the cutouts (150, 150') at least in part.

5. The plug connector module (1, 1') as claimed in claim 1,
wherein the shield element (15, 15') consists of a sheet metal part which is embodied as a stamped and bent part and is bent at right angles at four parallel bending edges, and
wherein the shield element (15, 15') has, at two fastening edges thus adjacent to one another, fastening means for fastening them to one another and thus for producing a closed frame form.

6. The plug connector module (1, 1') as claimed in claim 5,
wherein the shield element (15, 15') is a stamped and bent part.

7. A plug connector module (1, 1'), comprising:
a substantially cuboidal insulation body (10, 10') formed from an electrically insulating material,
wherein the insulation body (10, 10') has
a plug in region (110, 110') with a plug in side (111, 111') and, opposite and parallel thereto,
a cable connection side (127, 127'),
wherein the cable connection side (127, 127') and the plug in side (111, 111') are connected to one another via continuous contact chambers (100, 100') for receiving electrically conductive plug contacts (13, 13'),
wherein the insulation body (10, 10') furthermore has
two narrow sides (103, 103') running perpendicularly to its cable connection side (102, 102') and plug in side (111, 111') and arranged opposite and parallel to one another, and, at right angles thereto,
two broad sides (104, 104') arranged opposite and parallel to one another,
wherein a detent lug (121, 121', 122 122') for fixing the plug connector module (1, 1') in a plug connector modular frame (2) is integrally molded on each narrow side,
wherein these two mutually opposed detent lugs (121, 121', 122, 122') differ in their shape and/or size in order to thus ensure, as polarization means, a correct orientation of the plug connector module (1, 1') in the plug connector modular frame (2),
wherein the plug connector module (1, 1') is form fittingly surrounded on its broad (104, 104') and narrow sides (103, 103') by a peripheral shield element (15, 15'),
wherein the shield element (15, 15') covers more than 50% of an area of each of the broad sides (104, 104') and narrow sides (103, 103') and has an opening both on the cable connection side (127, 127') and on the plug in side (111, 111') of the insulation body (10, 10'), and
wherein the plug connector module (1, 1'), additionally to the shield element (15, 15'), furthermore has, on at least one of its two broad sides (104, 104'), at least one separate shield transfer element (14, 14').

8. The plug connector module (1, 1') as claimed in claim 7, wherein the at least one separate shield transfer element (14, 14') is formed in one piece as a stamped and bent part from sheet metal and is substantially flat.

9. The plug connector module (1, 1') as claimed in claim 7, wherein the at least one separate shield transfer element (14, 14') is in electrical contact with the shield element (15, 15').

10. The plug connector module (1, 1') as claimed in claim 7, wherein the at least one separate shield transfer element (14, 14'), for ground connection to the cable, has, on the cable connection side, a cable connection region (142, 142').

11. The plug connector module (1, 1') as claimed in claim 9, wherein the shield element (15, 15'), to establish the electrical contact with the shield transfer element (14, 14'), has inwardly bent contact tabs (156, 156') on at least one of its broad side walls (154, 154').

12. A plug connector modular system, comprising an at least partly metal plug connector modular frame (2) and at least one plug connector module (1, 1') arranged and fixed therein, wherein the at least one plug connector module (1, 1') comprises a substantially cuboidal insulation body (10, 10') formed from an electrically insulating material, wherein the insulation body (10, 10') has a plug in region (110, 110') with a plug in side (111, 111') and, opposite and parallel thereto, a cable connection side (127, 127'), wherein the cable connection side (127, 127') and the plug in side (111, 111') are connected to one another via continuous contact chambers (100, 100') for receiving electrically conductive plug contacts (13, 13'), wherein the insulation body (10, 10') furthermore has two narrow sides (103, 103') running perpendicularly to its cable connection side (102, 102') and plug in side (111, 111') and arranged opposite and parallel to one another, and, at right angles thereto, two broad sides (104, 104') arranged opposite and parallel to one another, wherein a detent lug (121, 121', 122 122') for fixing the plug connector module (1, 1') in a plug connector modular frame (2) is integrally molded on each narrow side, wherein these two mutually opposed detent lugs (121, 121', 122, 122') differ in their shape and/or size in order to thus ensure, as polarization means, a correct orientation of the plug connector module (1, 1') in the plug connector modular frame (2), wherein the plug connector module (1, 1') is form fittingly surrounded on its broad (104, 104') and narrow sides (103, 103') by a peripheral shield element (15, 15'), wherein the shield element (15, 15') covers more than 50% of an area of each of the broad sides (104, 104') and narrow sides (103, 103') and has an opening both on the cable connection side (127, 127') and on the plug in side (111, 111') of the insulation body (10, 10'), and wherein the shield element (15, 15') is electrically connected to the plug connector modular frame (2) via the outwardly directed contact tab (152, 152').

13. The plug connector modular system as claimed in claim 12, wherein the at least one plug connector module (1, 1') is fixed in the plug connector modular frame (2) and additionally polarized in a predefined orientation as a result of its detent lugs (121, 121', 122, 122') engaging form fittingly in differently sized detent windows (210, 220), which the plug connector modular frame (2) has on two mutually opposed side walls (21, 22).

* * * * *